United States Patent
Chhorn

(10) Patent No.: US 10,391,977 B1
(45) Date of Patent: Aug. 27, 2019

(54) METHOD AND A DEVICE FOR DETECTING TAMPERING OF A VEHICLE AND NOTIFYING AN OWNER OF THE VEHICLE

(71) Applicant: Vanrithy Chhorn, Long Beach, CA (US)

(72) Inventor: Vanrithy Chhorn, Long Beach, CA (US)

(*) Notice: Subject to any disclaimer, the term of this patent is extended or adjusted under 35 U.S.C. 154(b) by 0 days.

(21) Appl. No.: 16/051,620

(22) Filed: Aug. 1, 2018

(51) Int. Cl.
  *B60R 25/30* (2013.01)
  *B60R 25/31* (2013.01)
  *B60R 25/102* (2013.01)
  *B60R 25/10* (2013.01)
  *B60R 25/33* (2013.01)

(52) U.S. Cl.
  CPC .......... *B60R 25/305* (2013.01); *B60R 25/102* (2013.01); *B60R 25/31* (2013.01); *B60R 25/1004* (2013.01); *B60R 25/33* (2013.01); *B60R 2325/205* (2013.01)

(58) Field of Classification Search
  CPC ..... B60R 25/305; B60R 25/102; B60R 25/31; B60R 25/1004; B60R 25/33; B60R 2325/205
  See application file for complete search history.

(56) References Cited

U.S. PATENT DOCUMENTS

| | | | | |
|---|---|---|---|---|
| 4,298,792 A * | 11/1981 | Granholm | ............. | E05B 49/006 235/375 |
| 4,471,343 A * | 9/1984 | Lemelson | ............ | G08B 25/008 307/10.5 |
| 5,019,812 A * | 5/1991 | Gostahagberg | .... | G07C 9/00182 235/382.5 |
| 5,757,086 A * | 5/1998 | Nagashima | ......... | F02N 11/0807 123/179.2 |
| 6,396,390 B1 * | 5/2002 | Achhammer | ........... | B60R 25/00 340/10.33 |
| 6,741,165 B1 * | 5/2004 | Langfahl | ............. | B60R 25/1004 307/10.2 |
| 6,940,397 B1 * | 9/2005 | Le Mire | ............. | B60R 25/1004 180/287 |
| 7,319,378 B1 | 1/2008 | Thompson | | |
| 2004/0051379 A1 * | 3/2004 | Turner | ................. | B60R 25/045 307/10.2 |

(Continued)

*Primary Examiner* — Joseph H Feild
*Assistant Examiner* — Rufus C Point
(74) *Attorney, Agent, or Firm* — Sanchelima & Associates, P.A.; Christian Sanchelima; Jesus Sanchelima

(57) ABSTRACT

A device and a method for detecting tampering of a vehicle and notifying an owner of the vehicle are disclosed. The device is placed at a rearview mirror of the vehicle. The device comprises at least one Infrared Light Emitting Diode (LED) to detect presence of a vehicle key in the vehicle. The device comprises a motion sensor to detect motion or movement of the vehicle. The device comprises a camera to detect presence of an occupant in the vehicle and to capture an image of the occupant in the vehicle. When the motion sensor detects motion of the vehicle or the camera captures movement of the occupant in the vehicle when the vehicle key is not in the vehicle, the device transmits a notification to an owner of the vehicle. The notification includes an audible alarm or vibration. Further, the device transmits the notification to a home speaker placed in a house of the owner of the vehicle.

9 Claims, 5 Drawing Sheets

(56) References Cited

U.S. PATENT DOCUMENTS

| | | | | |
|---|---|---|---|---|
| 2004/0188164 A1* | 9/2004 | Maeno | B60R 25/1004 | 180/287 |
| 2004/0196179 A1* | 10/2004 | Turnbull | G01S 5/0221 | 342/357.75 |
| 2005/0012600 A1* | 1/2005 | Huang | B60R 25/0225 | 340/426.1 |
| 2005/0162260 A1* | 7/2005 | Gupte | B60R 25/1004 | 340/426.18 |
| 2006/0236970 A1* | 10/2006 | Inada | B60R 25/042 | 123/179.4 |
| 2006/0244576 A1* | 11/2006 | Sugie | B60R 25/1004 | 340/429 |
| 2006/0251293 A1* | 11/2006 | Piirainen | B60N 2/002 | 382/104 |
| 2007/0262853 A1* | 11/2007 | Bradus | B60R 25/1004 | 340/426.25 |
| 2008/0027602 A1* | 1/2008 | Yeap | B60R 25/04 | 701/31.4 |
| 2010/0305779 A1* | 12/2010 | Hassan | G01C 17/38 | 701/2 |
| 2011/0200193 A1* | 8/2011 | Blitz | H04L 9/3271 | 380/277 |
| 2013/0271273 A1* | 10/2013 | Oesterling | G07C 9/00309 | 340/426.18 |
| 2014/0072185 A1* | 3/2014 | Dunlap | G06K 9/00288 | 382/118 |
| 2014/0159883 A1* | 6/2014 | Damiani | B60R 25/102 | 340/426.13 |
| 2014/0343755 A1* | 11/2014 | Rasal | B60R 25/2045 | 701/2 |
| 2015/0070135 A1* | 3/2015 | Ford | B60R 25/24 | 340/5.72 |
| 2015/0263860 A1* | 9/2015 | Leboeuf | H04L 9/3226 | 713/171 |
| 2016/0225203 A1* | 8/2016 | Asmar | G07C 9/00309 | |

* cited by examiner

METHOD AND A DEVICE FOR DETECTING TAMPERING OF A VEHICLE AND NOTIFYING AN OWNER OF THE VEHICLE

BACKGROUND OF THE INVENTION

1. Field of the Invention

The present disclosure generally relates to vehicles. More specifically, the present disclosure relates to a method and a device for detecting theft of a vehicle and notifying authorized user or owner remotely therefrom.

2. Description of the Related Art

It is known that vehicles, be it land vehicles or sea vehicles or air vehicles are equipped with sensors to detect tampering or theft of the vehicle. The land vehicles may include but not limited to cars, trucks, buses and so on. The sea vehicles may include but not limited to boats, speed boat, ships and so on. The air vehicles may include but not limited to airplane, helicopters, drones and so on. The sensors are typically placed at doors of the vehicle. The sensors sense tampering of the vehicle and generate a visible and/or audible signal.

It is very well known that the vehicle is provided with a system, which activates lights and horn of the vehicle when the system detects tampering attempt when the vehicle is locked. With improvement in technology, several solutions have been provided which are much more advanced. One such solution includes providing a system that detects tampering of the vehicle. After detecting, the system is configured to send a notification to the owner on an electronic device i.e., mobile device of the owner. Further, the system is provided with a camera to capture an image of intruder or thief and send the image to the owner on the electronic device.

One such example is disclosed in U.S. Pat. No. 7,319,378. In U.S. Pat. No. 7,319,378, a vehicle anti-theft system having a sensor disposed in a vehicle to detect an unauthorized condition in or about the vehicle and for generating an alarm signal in response thereto is disclosed. The vehicle anti-theft system comprises a transceiver connected to the sensor for transmitting the alarm signal and receiving a remote activation signal. The vehicle anti-theft system comprises an imaging device disposed in the vehicle for imaging at least a portion of an occupant of the vehicle upon activation by the remote activation signal.

Although the above solution solves the problem of notifying the owner of the vehicle of the theft, there are still few problems that are not addressed with the existing solution. For example, if the owner is not carrying the electronic device, then the owner may not be aware of the notification sent by the system. Further, the system may raise false alarms at times. For instance, the system may detect that bystanders or people walking very close to the vehicle as being intruders and send the notification to the electronic device of the owner. In another example, a professional thief may tamper the system and enter into the vehicle quickly enough to de-activate the system before the system even activates sufficiently to be effective.

Other documents describing the closest subject matter provide for a number of more or less complicated features that fail to solve the problem in an efficient and economical way. None of these patents suggest the novel features of the present invention. Specifically, none of the disclosures in the art disclose a device or system placed inside a vehicle to detect presence of a key of the vehicle inside the vehicle and the vehicle being in motion to determine the theft and to notify an owner of the vehicle.

Therefore, there is a need in the art for a device or system to detect presence of a key of the vehicle inside the vehicle and the vehicle being in motion to determine the theft and to notify an owner of the vehicle.

SUMMARY OF THE INVENTION

It is one of the main objects of the present invention to provide a method and a device for detecting tampering of a vehicle and notifying an owner of the vehicle and avoids the drawbacks of the prior art.

It is one object of the present invention to provide a device provided in a vehicle for detecting tampering of the vehicle and notifying an owner of the vehicle.

It is one object of the present invention to provide a device provided in a vehicle used for detecting presence of a vehicle key in the vehicle and movement of the vehicle for determining tampering of the vehicle.

It is another object of the present invention to notify the owner of the vehicle at the vehicle key, an electronic device and a home speaker.

It is another object of the present invention to provide a device in a vehicle for detecting tampering of the vehicle and notifying an owner of the vehicle. The device is placed at a rearview mirror of the vehicle. The device comprises at least one Infrared Light Emitting Diode (LED) to detect presence of a vehicle key in the vehicle. The device comprises a motion sensor to detect motion or movement of the vehicle. The device comprises a camera to detect presence of an occupant in the vehicle and to capture an image of the occupant in the vehicle. When the motion sensor detects motion of the vehicle or the camera captures movement of the occupant in the vehicle when the vehicle key is not in the vehicle, the device transmits a notification to an owner of the vehicle. The notification includes an audible alarm or vibration. Further, the device transmits the notification to a home speaker placed in a house of the owner of the vehicle.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE EMBODIMENTS OF THE INVENTION

The following detailed description is intended to provide example implementations to one of ordinary skill in the art, and is not intended to limit the invention to the explicit disclosure, as one or ordinary skill in the art will understand that variations can be substituted that are within the scope of the invention as described.

The present disclosure discloses a device and a method for detecting tampering of a vehicle and notifying an owner of the vehicle. The device is placed at a rearview mirror of the vehicle. The device comprises at least one Infrared Light Emitting Diode (LED) to detect presence of a vehicle key in the vehicle. The device comprises a motion sensor to detect motion or movement of the vehicle. The device comprises a camera to detect presence of an occupant in the vehicle and to capture an image of the occupant in the vehicle. When the motion sensor detects motion of the vehicle or the camera captures movement of the occupant in the vehicle when the vehicle key is not in the vehicle, the device transmits a notification to an owner of the vehicle. The notification includes an audible alarm or vibration. Further, the device transmits the notification to a home speaker placed in a house of the owner of the vehicle.

Various features and embodiments of a device for detecting tampering of a vehicle and notifying an owner of the vehicle explained in conjunction with the description of FIGS. 1-5.

Figure 1:
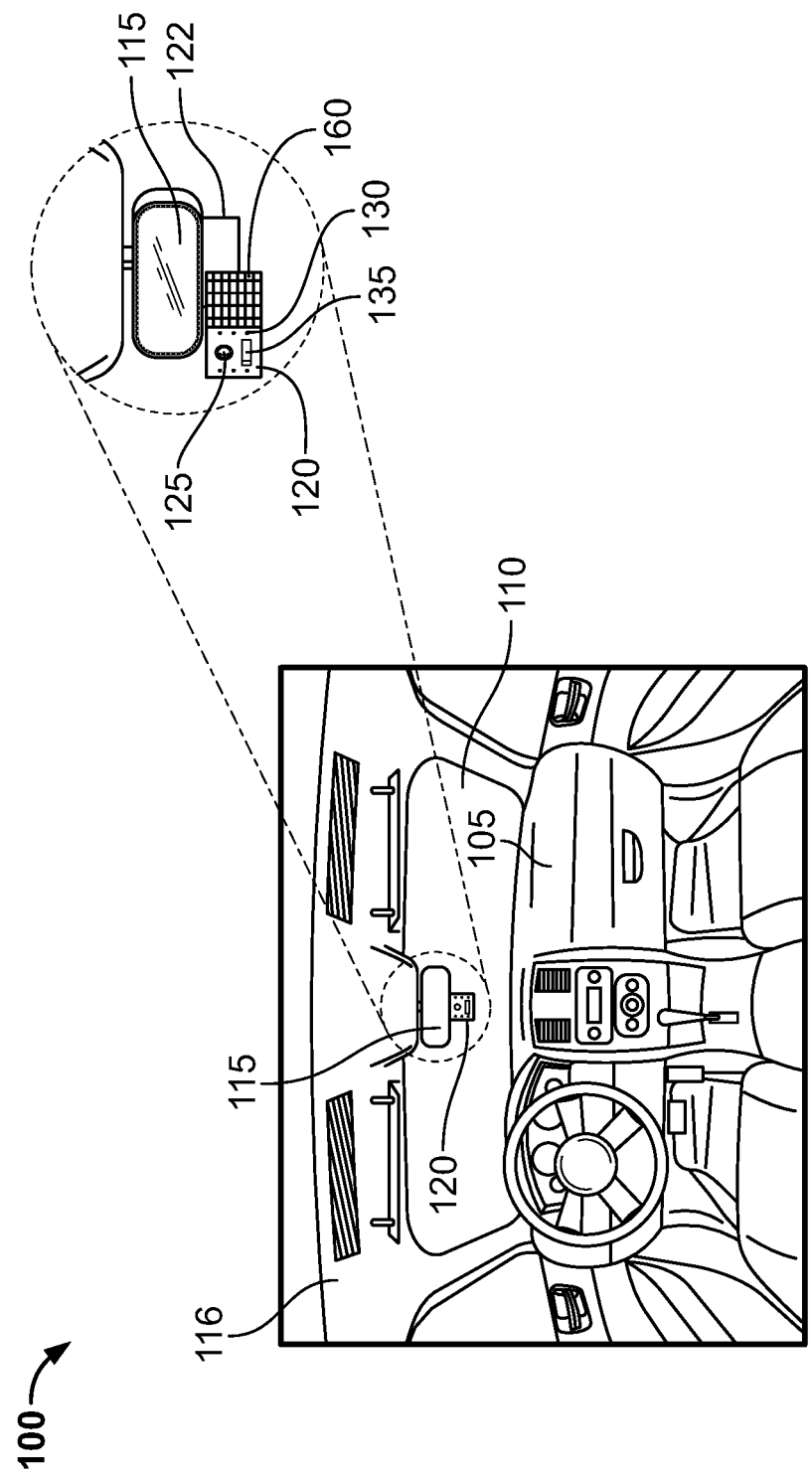
FIG. 1 illustrates a schematic diagram of a vehicle 100 comprising a device 120 for detecting tampering of the vehicle 100 and notifying an owner of the vehicle 100, in accordance with one embodiment of the present disclosure.

Referring to FIG. 1, a schematic diagram of a vehicle 100 comprising a device 120 for notifying tampering of the vehicle to an owner of the vehicle is shown, in accordance with one embodiment of the present disclosure. The vehicle 100 may include a car, truck, bus, ship, airplane and so on. The present disclosure is explained considering that the vehicle 100 is a car. However, it should be understood that the present disclosure could be implemented in any vehicle. The vehicle 100 comprises a dashboard 105 and a windshield 110. Further, the vehicle 100 further comprises a rear view mirror 115 at a rooftop 116 of the vehicle 100.

The rear view mirror 115 at its underside is provided with the device 120. In one example, the device 120 is coupled to the rear view mirror 115 using a connector 122. The connector 122 may include, but not limited to, a fastener, a clip and so on. It should be understood that the device 120 might be coupled to the rear view mirror 115 at underside using known mechanisms. The device 120 may be provided in different shapes, for example, in a square, rectangle or any other shape. The device 120 may be made up of plastic, metal or any other suitable material. It should be understood that the device 120 may be provide as an integral part of the vehicle 100 or as an attachment which can be removably attached at underside of the rearview mirror 115.

Figure 2:
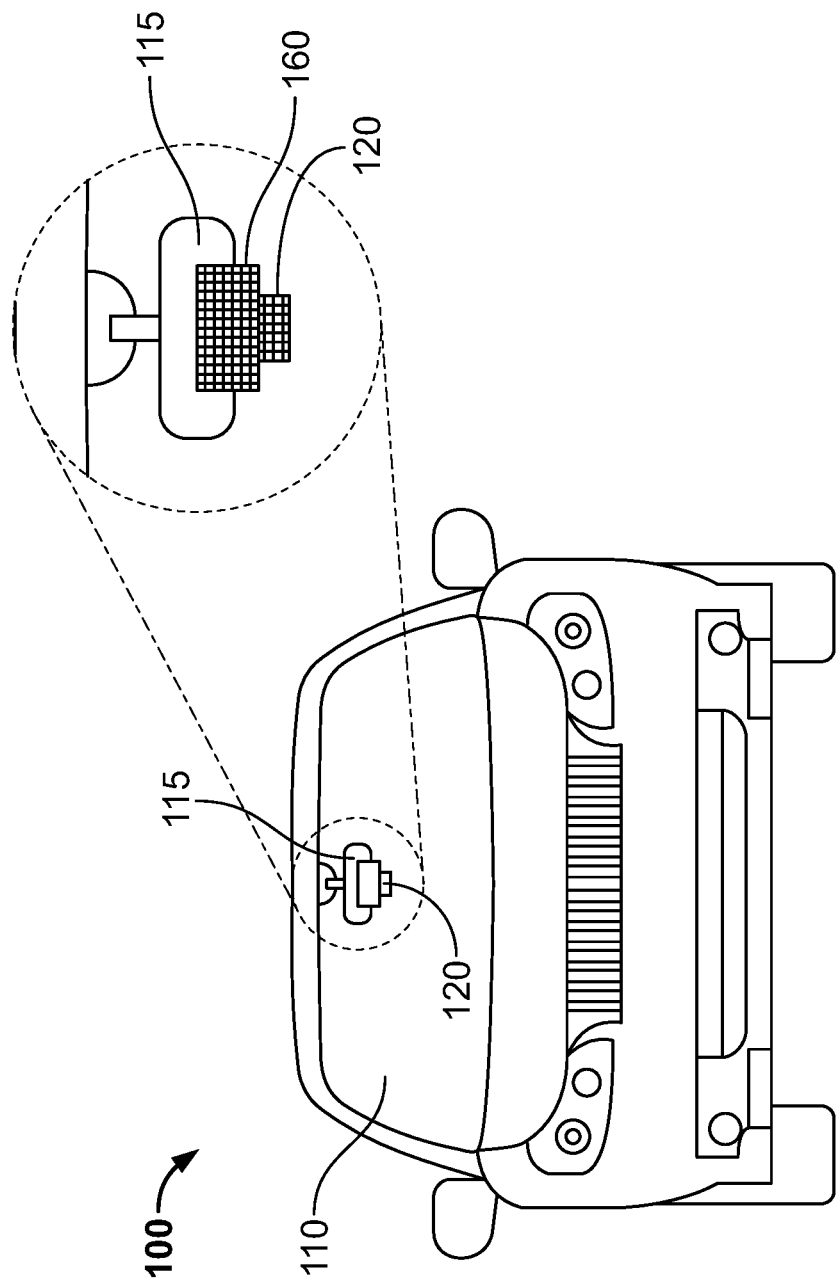
FIG. 2 illustrates a front view of the vehicle 100 comprising the device 120, in accordance with one embodiment of the present disclosure.
Figure 3:
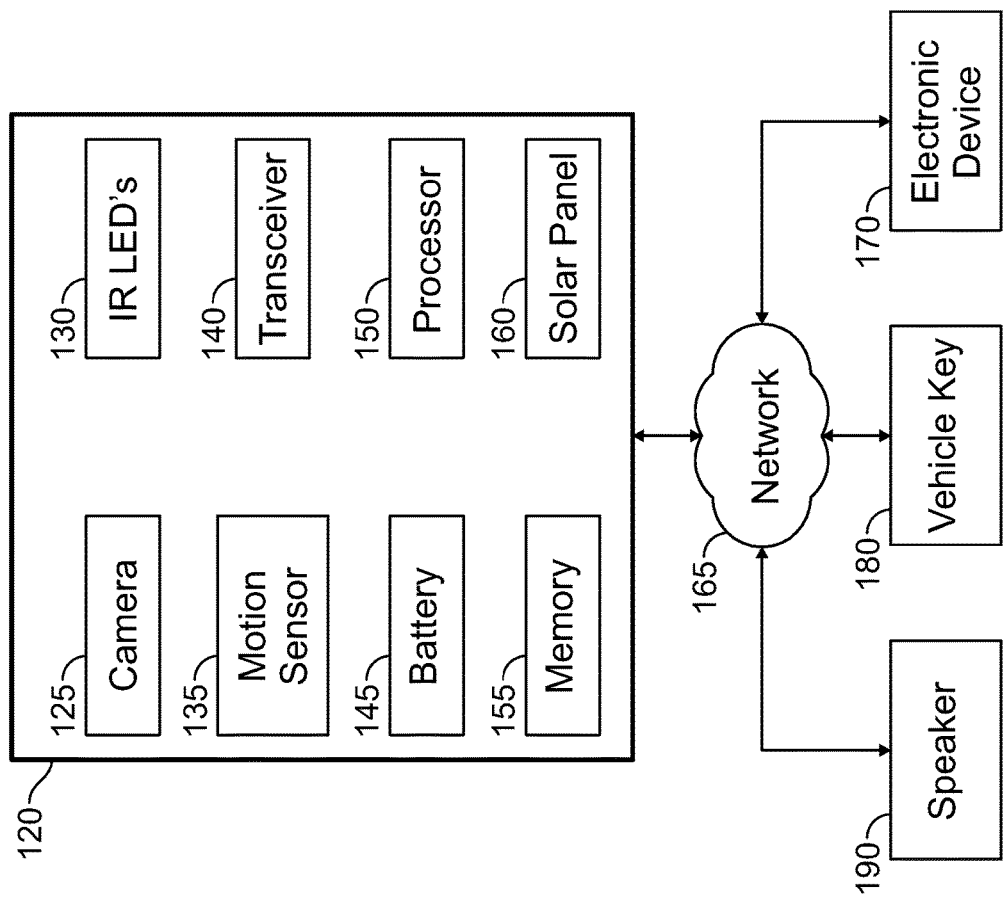
FIGS. 3 and 4 illustrate the device 120 communicatively coupled to an electronic device 170, a vehicle key 180 and a home speaker 190, in accordance with one embodiment of the present disclosure.
Figure 4:
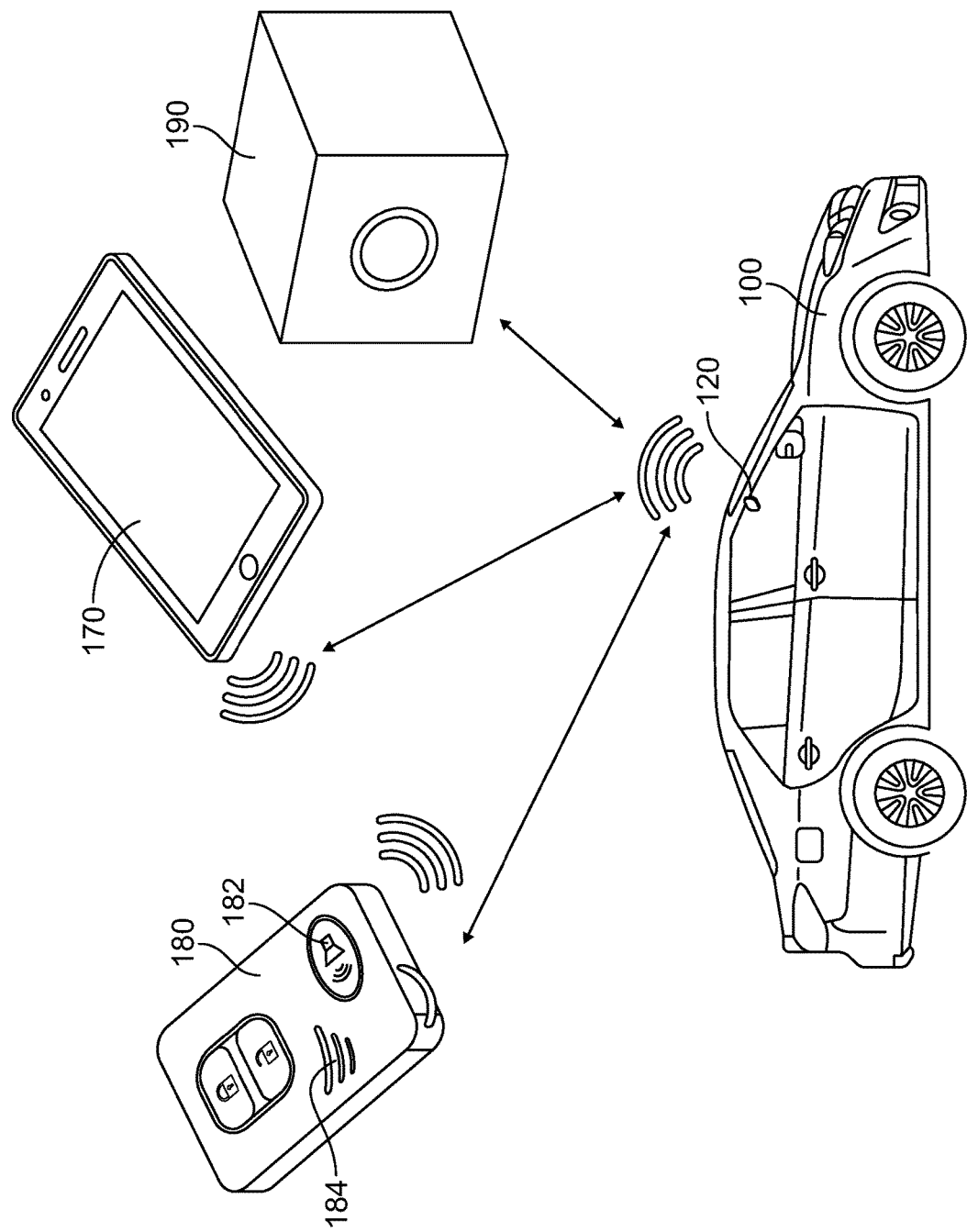

Referring to FIG. 2, a front view of the vehicle 100 showing the device 120 coupled at underside of the rearview mirror 115 is shown. Referring to FIG. 3 and FIG. 4, the device 120 for detecting tampering of the vehicle and notifying an owner of the vehicle is shown, in accordance with one embodiment of the present disclosure. As can be seen FIG. 1 and FIG. 3, the device 120 comprises a camera or an imaging unit 125, a plurality of Infrared Light-Emitting Diode (IR LEDs) 130, a motion sensor 135, a transceiver 140, a battery 145, a processor 150 and a memory 155. Further, the device 120 comprises a solar panel 160 at outer surface.

The camera 125 is placed in such a way that occupants of the vehicle 100 comes vicinity of the camera 125 to capture their images. The IR LEDs 130 is used to send out light with longer wavelengths than visible light. The motion sensor 135 is used to detect movement of the vehicle 100. In other words, the motion sensor 135 detects movement of the vehicle 100 either forward or backward directions.

The transceiver 140 is used to transmit and receive signal/data from external devices such as servers or other devices. The battery 145 may include a rechargeable battery such as Lithium Ion battery. The battery 145 is used to power the device 120.

The processor 150 may be implemented as one or more microprocessors, microcontrollers, microcomputers, central processing units, logic circuitries, and/or any devices that manipulate signals based on operational instructions. Among other capabilities, the controller 150 is configured to fetch and execute computer-readable instructions or program instructions stored in the memory 155.

The memory 155 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, and so on.

The solar panel 160 may be provided at outer surface of the device 120 such that the solar panel 160 is exposed to sunlight. Referring to FIG. 2, the solar panel 160 provided at the back of the device 120 is shown. Specifically, the solar panel 160 may be provided at the back of the device 120 and also over the surface of the rearview mirror 115 at its back to have maximum exposure to sunlight. The solar panel 160 may be used to charge the battery 135, which is used to operate the device 120.

Referring to FIG. 3 and FIG. 4, the device 120 coupled to an electronic device 170 via a network 165 is shown. In one implementation, the network 165 may be a wireless network, a wired network or a combination thereof. The network 165 can be implemented as one of the different types of networks, such as intranet, local area network (LAN), wide area network (WAN), the internet, and the like. The network 165 may include cellular network, Bluetooth, Infrared, Li-Fi, Wi-Fi and so on.

As specified above, the device 120 is provided at underside of the rearview mirror 115. The vehicle 100 is provided with a vehicle key 180, which is used to lock and unlock the vehicle 100. The vehicle key 180 may be provided with a first speaker 182 and a key fob 184. The first speaker 182 is used to provide audible alarm. The key fob 184 is a typical short-range radio transmitter, which communicates with a receiver (not shown) of the vehicle 100 within a certain range, e.g., 5-20 meters to lock or unlock a door of the vehicle 100. In one example, the IR LEDs 130 is used to detect proximity of the vehicle key 180 to the vehicle 100. Specifically, the IR LEDs 130 of the device 120 receives signals from the key fob 184 to detect presence or proximity of the vehicle key 180 in the vehicle 100. As can be seen in FIG. 3 and FIG. 4, the device 120 communicates with the vehicle key 180 via the network 165, preferably using Bluetooth or Infrared signals.

Further, the device 120 is communicatively connected to a home speaker 190 placed at a house of the owner of the vehicle 100. In one example, the device 120 is communicatively connected to the home speaker 190 via the network 165.

Now, the operation of the device 120 to detect tampering of the vehicle 100 and to notify the owner of the vehicle 100 is explained with the help of FIG. 3 and FIG. 4. The device 120 periodically or continuously sends signals to the vehicle key 180 to determine if the vehicle key 180 is in proximity to the device 120 i.e., proximity to the vehicle 100. If the vehicle key 180 is in proximity to the device 120 or the vehicle 100, then it is considered that an owner of the vehicle 100 is in inside or in vicinity of the vehicle 100. If the vehicle key 180 is not in proximity to the device 120 or the vehicle 100, then it is considered that the owner is neither inside nor in vicinity of the vehicle 100. In order to check whether the vehicle key 180 is in proximity to the device 120 or the vehicle 100, the device 120 employs the transceiver 140 to send signals to detect the presence of the vehicle key 180 inside or vicinity of the vehicle 100.

Further, the device 120 periodically or continuously checks if the vehicle 100 is in motion. Specifically, the device 120 employs the motion sensor 135 to detect movement or motion of the vehicle 120. If the motion sensor 135 detects that the vehicle 100 is in motion, then the device 120 verifies whether the vehicle key 180 is inside the vehicle 100. If the transceiver 140 detects that the vehicle key 180 is inside the vehicle 100, then the device 120 goes to sleep indicating that the owner of the vehicle 100 carrying the vehicle key 180 is inside or driving the vehicle 100. Further, if the motion sensor 135 detects that the vehicle 100 is in motion, and the transceiver 140 detects that the vehicle key 180 is not inside the vehicle 100, then the motion sensor 135 sends signals to the processor 150.

In one implementation, the device 120 may detect movement within the vehicle 100 when the vehicle key 180 is not inside the vehicle. In other words, the device 120 detects motion of a person inside the vehicle 100. In order to detect the motion of the person inside the vehicle 100, the device 120 may employ the IR LEDs 130. The device 120 may activate the IR LEDs 130 to detect infrared energy (heat) levels inside the vehicle 100. If the IR LEDs 130 detect heat radiated above a certain level, then it is considered that there is a person inside the vehicle 100. After determining that there is a person moving inside the vehicle 100 when the vehicle key 180 is not inside the vehicle, the IR LEDs 130 sends signals to the processor 150.

After receiving the signals from the IR LEDs 130 or the motion sensor 135 (when the vehicle key 180 is not in the vehicle 100), the processor 150 activates the camera 125 to capture image of an occupant of the vehicle 100. In one example, the camera 125 captures the image of the occupant i.e., driver and passengers in the vehicle 125. Further, the processor 150 employs the transceiver 140 to send notification to the electronic device 170, the vehicle key 180 and the home speaker 190.

In one example, the device 120 is configured to send notification to one of the electronic device 170, the vehicle key 180, the home speaker 190 and combination thereof. The notification may include a visible alarm or audible alarm or vibration. For example, the device 120 may send the notification to the electronic device 170 in the form of a text message. Further, the device 120 may send the notification having the image of the occupant along with the text message indicating tampering of the vehicle 100 by an unauthorized user or thief.

Similarly, the device 120 may send notification to the vehicle key 180. Upon receiving the notification, the vehicle key 180 is configured to generate an audible alarm or vibrate such that the owner of the vehicle 100 is alerted. In one example, the audible alarm is played using the first speaker 182 provided at the vehicle key 180.

Further, the device 120 may send notification to the home speaker 190 placed at the owner of the vehicle 100. The home speaker 190 is configured to play out the notification at certain volume such that the owner is alerted of the tampering of the vehicle 100.

In one implementation, the device 120 is configured to record series of images and transmit the images to the electronic device 170. Further, the device 120 may be configured to send the images to emergency personnel such as police.

It should be understood that the device 120 captures images of the occupant of the vehicle 100 only when the device 120 detects that the vehicle 100 is in motion when the vehicle key 180 is not inside the vehicle 100. In other words, the device 120 periodically or continuously checks presence of the vehicle key 180 in proximity to the vehicle 100 and motion of the vehicle 100. If the vehicle 100 is in not in motion, the device 120 is configured to switch to sleep mode where the device 120 requires minimum energy to operate. The device 120 is configured to turn on the camera 125 only when the device 120 detects that the vehicle 100 is in motion and the vehicle key 180 is not in the vehicle. As such, the device 120 can be operated using a miniature battery, which can be charged using the solar panel 160 placed at outer portion of the device 120.

Figure 5:
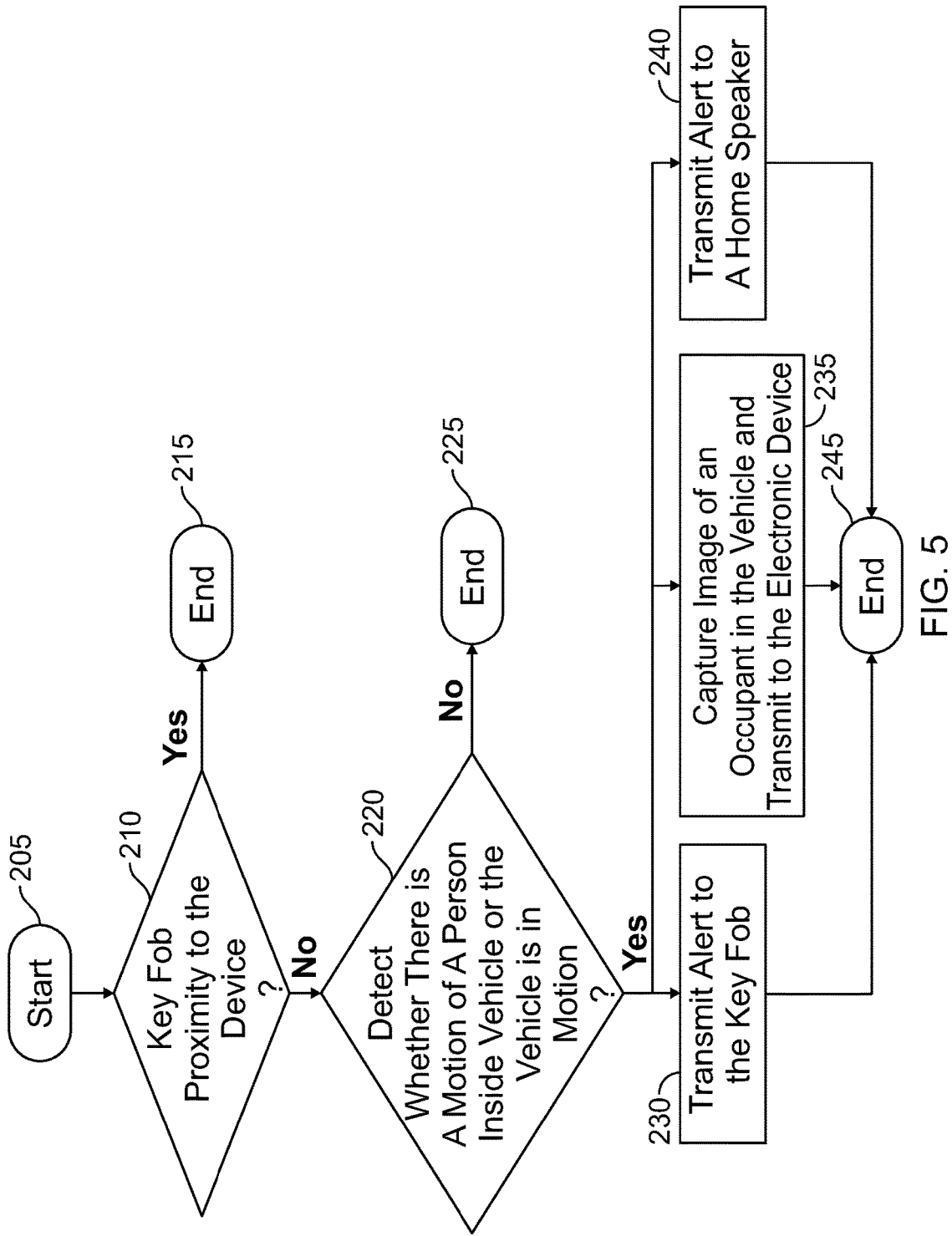
FIG. 5 illustrates a method 200 for detecting tampering of the vehicle 100 and notifying an owner of the vehicle 100, in accordance with one embodiment of the present disclosure.

Referring now to FIG. 5, a method 200 for detecting tampering of a vehicle and notifying an owner of the vehicle is shown, in accordance with an embodiment of the present disclosure. The method 200 may be described in the general context of computer executable instructions or a sequence of steps to be performed for automated checkout. However, the order in which the method 200 is described and is not intended to be construed as a limitation, and any number of the described method blocks can be combined in any order to implement the method 200 or alternate methods. Additionally, individual blocks may be deleted from the method 200 without departing from scope of the disclosure described herein. For ease of explanation, in the embodiments described below, the method 200 may be implemented in the above-described device 120.

At step 205, the method 200 starts.

At step 210, the device 120 checks if the vehicle key 180 i.e., the key fob 184 is within the vehicle 100. If the device 120 detects that the key fob 184 is within the vehicle 100, then the method 200 is terminated, as shown in step 215. If the device 120 detects that the key fob 184 is not in the vehicle 100, then the method 200 proceeds to step 220.

At step 220, the device 120 checks whether the vehicle 120 is motion. If the device 120 detects that the vehicle 100 is not moving, then the method 200 is terminated, as shown in step 225. If the device 120 detects that the vehicle 100 is moving, then the method 200 proceeds to steps 230, 235 and 240. It should be understood that the vehicle 100 is considered as being tampered by an unauthorized user or thief when the device 120 detects that the vehicle 100 is moving without the presence of the vehicle key 180 in the vehicle 100. In another implementation, the device 100 checks whether there is a movement of a person inside the vehicle 100, at step 220. If the device 120 detects movement of the person inside the vehicle 100, then the method 200 proceeds to steps 230, 235 and 240. Movement of the person inside the vehicle 100 when the vehicle key 180 is not present in the vehicle 100 indicates the vehicle 100 being tampered with by the person inside the vehicle 100.

At step 230, the device 120 transmits a notification or an alert to the vehicle key 180. The notification indicates the vehicle 100 being tampered based on the detection of movement inside the vehicle 100 or movement of the vehicle 100. The notification may include an audible alarm or vibration.

At step 235, the device 120 captures image of the unauthorized user and transmits to the electronic device 170. Specifically, the device 120 may employ the camera 125 to capture the image of the unauthorized user and employ the transceiver 140 to transmit the image to the electronic device 170.

At step 240, the device 120 transmits an alert to the home speaker 190. The notification may include an audible alarm.

At step 245, the method 200 ends.

Although the above description is explained considering that the device is provided at underside of the rearview mirror, it should be obvious to a person skilled in the art to place the device at the door (not shown) of the vehicle. Specifically, the device is placed in such a way that the camera faces the occupant i.e., driver of the vehicle and the device (solar panel of the device) comes in contact with sunlight such that the battery can be charged using the sunlight.

In an alternate embodiment, the device may be embedded within the rearview mirror such that the device is not visible normally. The solar panel may be placed at back of the rearview mirror to power the device placed inside the rearview mirror.

It is understood from the above disclosure that the device is used to detect unauthorized use of the vehicle with the help of the vehicle key rather than the sensors placed at the doors of the vehicle, as disclosed in prior art. As such, the device can be removably attached to the vehicle without having to alter mechanical parts of the vehicle. The device can be removed from one vehicle and can be placed in another vehicle to detect tampering of the vehicle and to notify the owner of the vehicle.

As the device is capable of alerting the owner at the vehicle key, the electronic device and the home speaker, the owner of the vehicle may get alerts quickly than in the prior art.

In one alternate embodiment, the device may be provided with a Global Positioning System (GPS) sensor (not shown) to detect location of the vehicle. Whenever the device detects that the vehicle is in motion when the vehicle key is not in the vehicle, the device may activate GPS sensor and send the location of the vehicle to the electronic device. The owner may use the information corresponding to the location and track the vehicle.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A device for detecting tampering of a vehicle and notifying an owner of the vehicle, the device comprising:
   a vehicle key including a key fob and a key fob speaker, said key fob communicates with said vehicle, said vehicle key generates an audible alarm through said key fob speaker in the case that said owner of said vehicle is to be notified;
   at least one Infrared Light Emitting Diode (LED) adapted to detect said vehicle key being in proximity to the vehicle and to detect infrared energy, wherein if said at least one Infrared Light Emitting Diode (LED) detects heat being radiated above a predetermined certain level, but not said vehicle key then an unauthorized user is also detected;
   a motion sensor to detect motion of the vehicle, said device configured to switch to a sleep mode wherein minimum energy is used by said device when said motion sensor has detected no movement of the vehicle;
   a camera mounted to a rear view mirror of said vehicle facing an interior space of said vehicle, adapted to capture the image of said unauthorized user, said camera configured to turn only when said device detects that said vehicle is in motion and said vehicle key is not in the vehicle; and
   a transceiver to transmit an alert, such that when the motion sensor detects motion of the vehicle or the camera captures movement of the occupant unauthorized user in the vehicle when the vehicle key is not in the vehicle, the transceiver transmits a notification to an owner of the vehicle.

2. The device of claim 1, wherein the device communicates with the vehicle key using Bluetooth or Infrared signals.

3. The device of claim 1, wherein alert comprises the image of the unauthorized user captured by the camera when the motion sensor detects motion of the vehicle or the camera captures movement of the unauthorized user in the vehicle when the vehicle key is not in the vehicle.

4. The device of claim 1, further comprises a battery.

5. The device of claim 4, further comprises a solar panel to charge the battery.

6. The device of claim 1, wherein the device is coupled to a dashboard or a rearview mirror of the vehicle.

7. The device of claim 1, further comprises a speaker located at a remote location from said vehicle or said key fob to provide an alarm when the motion sensor detects motion of the vehicle or the camera captures movement of the occupant unauthorized user in the vehicle when the vehicle key is not in the vehicle.

8. The device of claim 1, wherein the notification is transmitted to one of the vehicle key, a home speaker, and an electronic device of the owner of the vehicle.

9. The device of claim 1, wherein the notification comprises one of a text message, audio alert, a visible alarm, and an image of the occupant.

* * * * *